Jan. 17, 1928.
B. MESSINGER ET AL
1,656,527
DISPLAY DEVICE
Filed Nov. 8, 1926
2 Sheets-Sheet 1
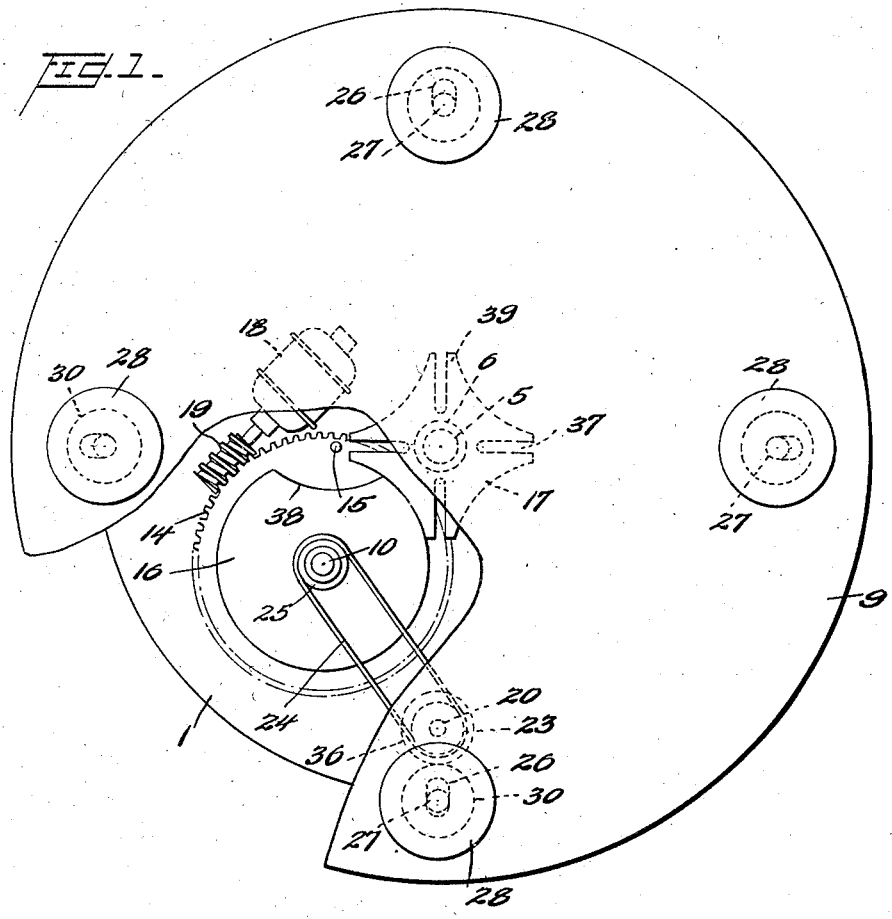
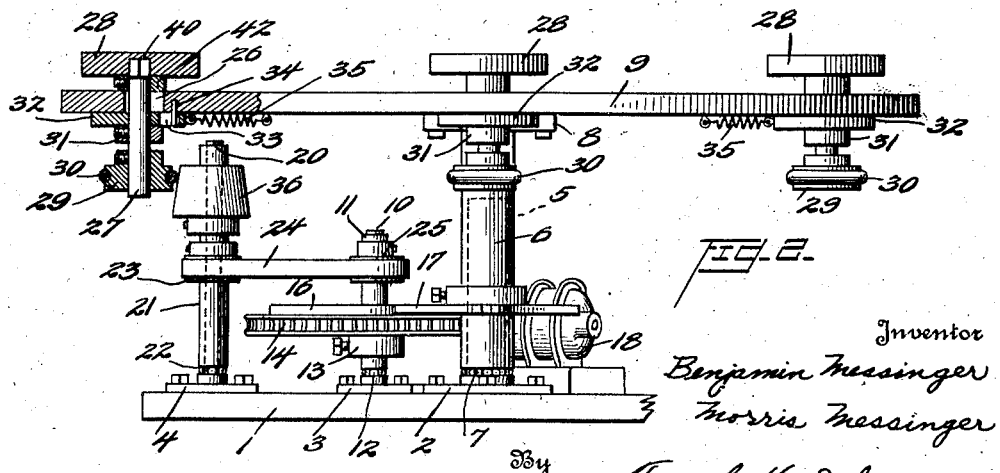
Inventor
Benjamin Messinger
Morris Messinger
By Frank H. Schwartz
Attorney Jan. 17, 1928.  1,656,527
B. MESSINGER ET AL
DISPLAY DEVICE
Filed Nov. 8, 1926  2 Sheets-Sheet 2
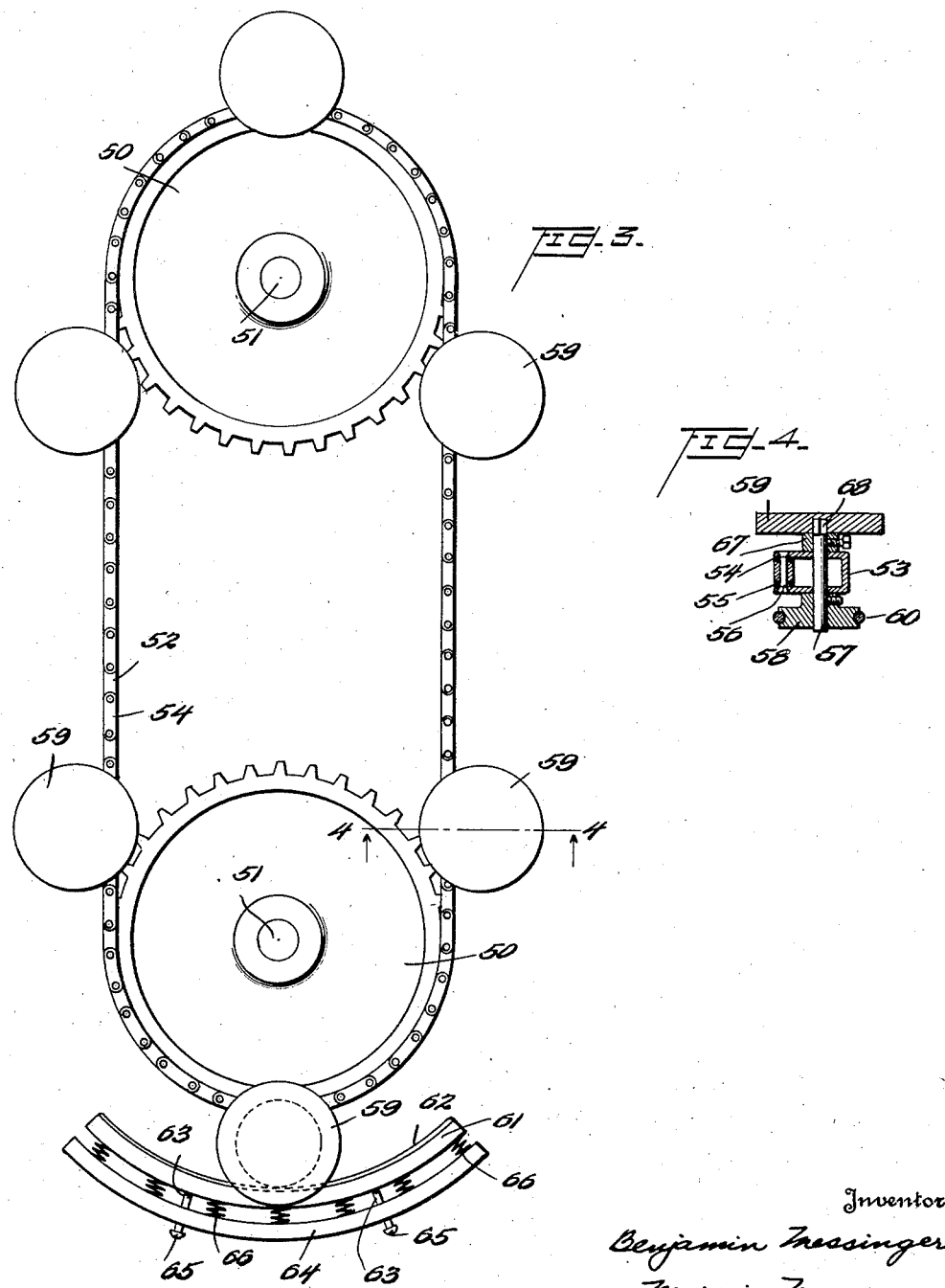
Inventor
Benjamin Messinger
Morris Messinger
By
Frank H. Schwartz
Attorney Patented Jan. 17, 1928.

1,656,527

UNITED STATES PATENT OFFICE.

BENJAMIN MESSINGER AND MORRIS MESSINGER, OF BROOKLYN, NEW YORK.

DISPLAY DEVICE.

Application filed November 8, 1926. Serial No. 147,091.

This invention relates to display devices, and more particularly to those for displaying garments, shoes, etc., in store windows, and comprises all improvements over the prior art which are disclosed in this application.

One object is to provide a device which will display goods in an improved and more impressive manner.

The above and other objects which will hereinafter appear are attained by new and useful improvements as disclosed in this application. To enable others skilled in the art to fully understand the essential features of the improvements drawings have been annexed as a part of this disclosure.

Fig. 1 is a top plan view of one form of the device, with a portion in section.

Fig. 2 is a right side elevation of Fig. 1 with a portion in section.

Fig. 3 is a top plan view of a modified form of device.

Fig. 4 is a section on line 4—4 of Fig. 3.

The embodiment of the invention which is disclosed in Figures 1 and 2 for illustrative purposes, is as follows.

Mounted on a base 1 which may be annular, are three flanged members 2, 3, 4 secured to the base 1 by bolts, screws or other means. Securely fastened within the center of member 2 is a fixed vertical stud 5. Freely rotating on the stud 5, is a hollow shaft 6 resting on ball thrust bearing 7. Hollow shaft 6 is securely fastened in a flanged member 8 firmly secured to table 9.

Secured to flanged member 3 is a stud 10, freely rotating on which is a hollow shaft 11 resting on ball thrust bearing 12. Fastened on hollow shaft 11 is a hub 13 having worm gear 14, drive pin 15 on the latter, and locking disc 16. Secured on shaft 6 is a driven plate 17 which together with parts 14, 15 and 16 constitutes one form of the well known "Geneva movement". Secured to base 1 is a motor 18 having worm 19 meshing with worm gear 14. Instead of the Geneva movement herein disclosed, any of the other well known types or intermittent drives may be used, such for instance as the use of an intermittent gear on shaft 10 co-operating with a gear on shaft 5.

Secured to flanged member 4 is a stud 20, freely rotating on which is a hollow shaft 21 resting on ball thrust bearing 22. Fastened to shaft 21 is pulley 23 driven by belt 24 from pulley 25 fastened on shaft 11.

Table 9 is provided with elongated slots 26 through which extend shafts 27 each having a collar 42 secured to the shaft and a display support 28 removably mounted on the squared upper end 40 of shaft 27. On the lower end of each shaft 27 is secured pulley 29 preferably provided with a friction surface 30 of soft rubber or other suitable material. Above pulley 29 is a collar 31 secured to shaft 27. Between collar 31 and table 9 is a plate 32 lose on shaft 27 and having a slot 33 engaged by pin 34 secured to table 9 to prevent rotation of plate 32. Plate 32 is connected to tension spring 35 which is secured to table 9 and normally holds shaft 27 at the end of the slot 26 which is nearest the center of table 9.

Mounted on the upper end of hollow shaft 21 is a cone drive member 36 preferably faced with soft rubber or other desired friction material. Member 36 may be adjusted up or down on shaft 21 either to take up wear of friction drive parts 30, 36 or to provide for variation of speed of rotation of display support 28, or both.

It will be observed that by lifting table 9 up, shafts 27 and 6 together with parts secured on these shafts lift up with table 9. Therefore by merely lifting off table 9, all of the driving mechanism is immediately exposed for repair or adjustment.

With garments, shoes or other things mounted on display supports 28, the motor 18 is started, and through worm 19 and worm gear 14, drive pin 15 enters one of the slots 37 of driven plate 17. It will be observed that the number of slots 37 corresponds to the number of display supports 28. Locking disc 16 is cut away at 38 to provide clearance for portions 39 of plate 17, and pin 15 by engaging in one of slots 37 rotates plate 17 and therefore shaft 6 and table 9, the angular distance between the centers of two adjacent slots. When pin 15 leaves slot 37, the curved interengaging portions of parts 16 and 17 temporarily lock the part 17 and therefore table 9, against rotation in either direction.

It will be observed that just as pin 15 leaves a slot 37, one of the pulleys 29 will engage cone drive member 36 and be held thereagainst by spring 35. And since shaft 20 is driven constantly, the display support 28 will be rotated (preferably slowly). When pin 15 completes its rotation and engages the next slot 37 it rotates the table another step, removing one support 28 from the display zone and bringing the next display support 28 into the display zone and causing it to be rotated. This operation continues as long as motor 18 continues to run.

In Figs. 3 and 4 is shown a modified construction. A pair of sprockets 50 are mounted for rotation on shafts 51. Extending around sprockets 50 is chain 52 carrying display supports 59. Each U-shaped member 53 is secured above and below chain link plates 54, 55 by rivets 56 or other suitable means, and rotatably mounted in member 53 is shaft 57 having secured to it, pulley 58, collar 67 and display support 59 removably mounted on the squared end 68 of shaft 57. Pulley 58 preferably has friction part 60 of soft rubber or other suitable material.

In the display zone and concentric with one sprocket 50, is a display support rotating member 61 preferably faced with soft rubber or other friction surface 62. Member 61 is carried by screws 63 secured to it, which screws extend freely through support 64 and have heads 65 for the purpose of engaging support 64 and limiting the travel of member 61 away from support 64 under action of compression springs 66.

The mechanism described can be mounted on any suitable base, and when one of the shafts 51 is rotated, chain 52 is caused to travel to successively bring each display support past member 61, and as each display support passes member 61 it is rotated by engagement of friction parts 60, 62, member 61 being pushed back against action of springs 66. When the display support passes beyond part 61, it ceases to rotate, and heads 65 of screws 63 engage the back of support 64.

Considerable changes in the mechanism disclosed can obviously be made and therefore all changes which properly come within the spirit and range of equivalency of the following claims are intended to be embraced within the scope of the claims.

We claim:

1. A display device comprising, carrying means adapted to travel in a display path during a portion of its travel, one or more display supports mounted to rotate on, and relative to said carrying means, means for causing the carrying means to travel and for rendering the carrying means temporarily stationary as each display support reaches a predetermined location in said display path, and means adapted to rotate each display support while at said predetermined location.

2. The display device of claim 1 in which the display path is curved.

3. A display device comprising, a table, one or more display supports mounted to rotate on and relative to said table, means for rotating said table to bring each display support to a predetermined location and for rendering said table temporarily stationary as each display support reaches said predetermined location, and means adapted to rotate each display support while at said predetermined location.

4. A display device comprising, a table, one or more display supports mounted to rotate on and relative to said table, means for intermittently rotating the table to successively bring each display support to a predetermined location and for causing the rotation of the table to automatically cease as each display support reaches said predetermined location, and driving means located adjacent said predetermined location for rotating each display support while it is at said predetermined location.

5. The display device of claim 4, in which said driving means is continuously driven.

6. The display device of claim 4 in which said driving means is of a friction type and comprises adjustable speed varying means.

7. The display device of claim 4 in which each display support is yieldingly mounted in a direction transverse to its axis of rotation.

8. The display device of claim 4 in which said driving means comprises a friction driving member, and a friction driven member on each display support, each display support being yieldingly mounted in a direction transverse to its axis of rotation.

BENJAMIN MESSINGER.
MORRIS MESSINGER.